United States Patent [19]

Luecke

[11] Patent Number: 5,116,004
[45] Date of Patent: May 26, 1992

[54] VERTICALLY ADJUSTABLE MOUNTING POST FOR OPTICAL ELEMENT

[75] Inventor: Francis S. Luecke, San Jose, Calif.

[73] Assignee: New Focus, Inc., Mountain View, Calif.

[21] Appl. No.: 698,429

[22] Filed: May 10, 1991

[51] Int. Cl.⁵ .............................................. F16M 11/00
[52] U.S. Cl. .................................. 248/161; 248/157; 248/180; 248/188.4; 248/188.5
[58] Field of Search ............ 248/161, 404, 405, 406.1, 248/413, 157, 180, 644, 188.4, 188.5; 403/43, 45, 47

[56] References Cited

U.S. PATENT DOCUMENTS

| 3,521,341 | 7/1970 | Hörnlein et al. | 248/161 X |
| 3,667,716 | 6/1972 | Fries | 248/405 |
| 4,784,359 | 11/1988 | Westover | 248/274 |
| 4,973,185 | 11/1990 | Thaller | 403/43 X |
| 5,011,104 | 4/1991 | Fang | 248/161 X |

Primary Examiner—Ramon O. Ramirez
Attorney, Agent, or Firm—Townsend and Townsend

[57] ABSTRACT

An adjustable height support column comprises a base plate and a support plate joined together by an axially adjustable linking mechanism. The linking mechanism includes a first threaded shaft attached to the base plate and a second threaded shaft attached to the support plate, where the two shafts are hollow and can engage each other telescopically. The linking mechanism further includes a bridging mechanism which permits the shafts to translate axially relative to each other while maintaining a fixed relative rotational orientation. A coupling member threadably engages the outside of the shaft so that rotation of the coupling member effects axial translation of the shafts relative to each other.

13 Claims, 2 Drawing Sheets

VERTICALLY ADJUSTABLE MOUNTING POST FOR OPTICAL ELEMENT

BACKGROUND OF THE INVENTION

The present invention relates generally to apparatus for adjustably mounting optical elements, such as mirrors, beam splitters, lens, gratings, and the like. More particularly, the present invention relates to a mounting post or support column which may be vertically adjusted over an extended range.

The use of adjustable mounting apparatus for supporting optical components, such as mirrors, beam splitters, lenses, gratings, and the like, is known. Such apparatus frequently include a vertically adjustable post or support column comprising a pair of telescoping elements with a lock assembly which permits the post to be fixed at a desired height.

Of particular interest to the present invention are support columns comprising a vertically translatable threaded shaft and a vertically fixed rotatable nut. The nut is disposed about the shaft, and rotation of the shaft is prevented, typically by a slot and key combination which permits the desired vertical movement. The threaded shaft carries a support plate on its upper end and the entire assembly is secured to a base plate which may be fixed to a surface or other desired location. With such a design, manual rotation of the nut causes the shaft to vertically translate to a desired height. The height can be locked, typically by a separate locking screw which engages the shaft.

While such support column designs have proved successful, they are limited in their range of adjustability. That is, the use of a single translating threaded shaft limits the height adjustability to a range of less than 2:1. In practice, because of mechanical limitations, the range of adjustability is typically much less.

For these reasons, it would be desirable to provide improved mounting posts and support columns, particularly for use in supporting optical components. The mounting posts should be mechanically simple, sturdy, and easily adjustable, preferably requiring only a single hand for adjustment. The mounting posts should further provide for a height adjustment ratio greater than 2:1, while providing stable support at all points along its adjustment range.

SUMMARY OF THE INVENTION

The present invention provides an adjustable height support column including a first plate, typically a base plate for mounting on a surface, and a second plate, typically a support plate for mounting components, such as optical elements. The first plate includes a first threaded shaft and the second plate includes a second threaded shaft, where one of the threaded shafts is telescopically received in the other. A bridging or linking mechanism is provided for slidably aligning the shafts so that they can be axially translated relative to one another while preventing relative rotation. The bridging mechanism is disposed within the interior of the shafts and has a length which is generally equal to the length of each of the shafts. In this way, the support column can be collapsed with the shafts fully telescoped together and the bridging mechanism contained fully within the interior of the shafts. Conversely, the height of the support column can be axially extended so that the bridging mechanism holds the shafts together, with the full length approaching three times that of the collapsed length.

The length of the support column is adjusted with a coupling member having first and second threaded ends which engage the first and second threaded shafts respectively. Rotation of the coupling member thus causes axial translation of the shafts relative to each other while the bridging mechanism prevents relative rotation of the shafts. Optionally, a locking mechanism, such as a clamping screw on the coupling member, may be provided.

The adjustable height support column of the present invention will have an adjustability range of at least about 2:1 based on the ratio of its fully extended length to its fully retracted length. Usually, the adjustability range will be at least 2.2:1 and may be 2.5:1 or higher. The theoretical limit of 3:1 cannot be achieved because of the need to overlap the various components in order to provide for mechanical stability. The support column design is simple and affords a stable support platform for various components, such as optical elements, at all adjustable heights. The column further provides for precise height adjustment while substantially preventing rotational misalignment of the support column. These and other advantages will be more fully described hereinafter with reference to the drawings.

DESCRIPTION OF THE SPECIFIC EMBODIMENTS

Figure 1:
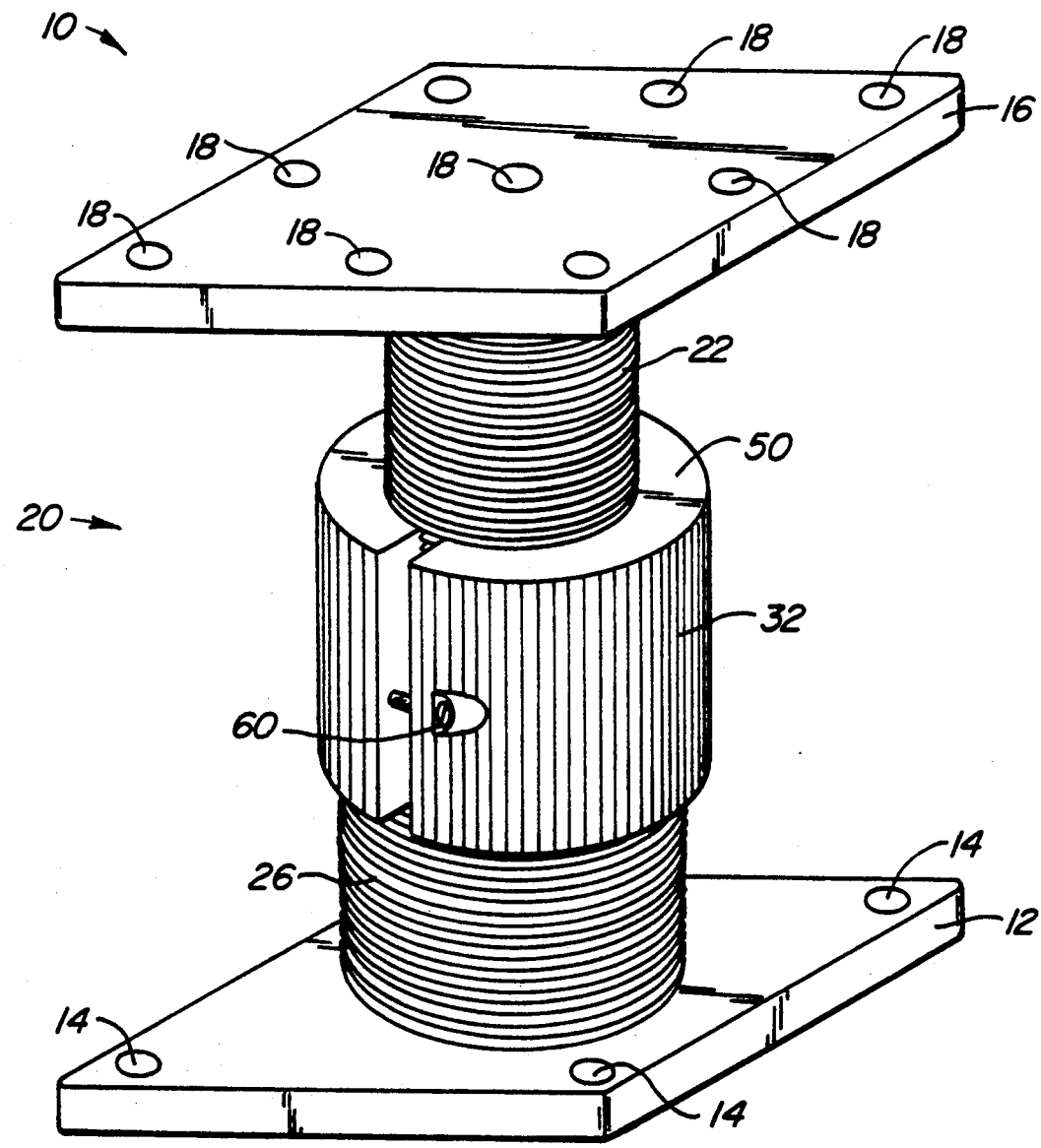
FIG. 1 is an isometric view of an exemplary embodiment of the adjustable height support column of the present invention.
Figure 2:
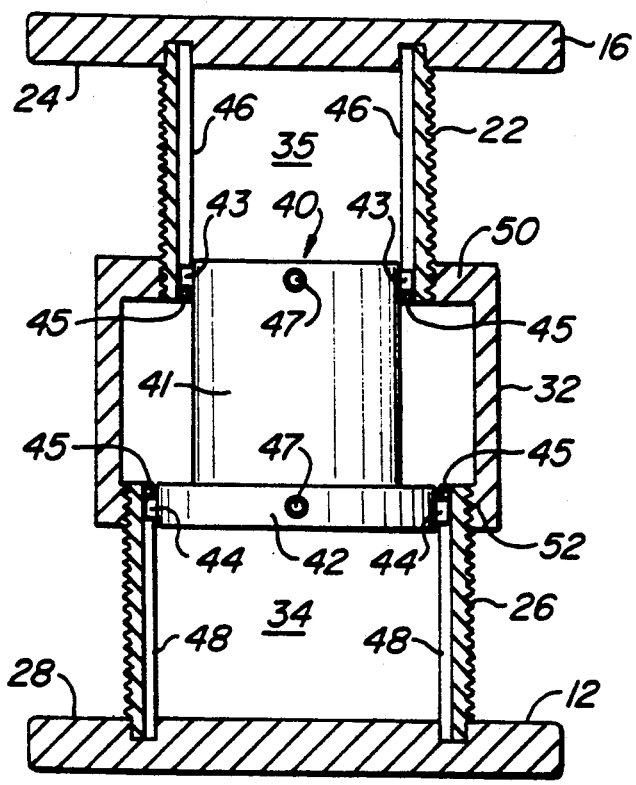
FIG. 2 is a sectional view of the adjustable height support column of FIG. 1, shown with its height fully extended.
Figure 3:
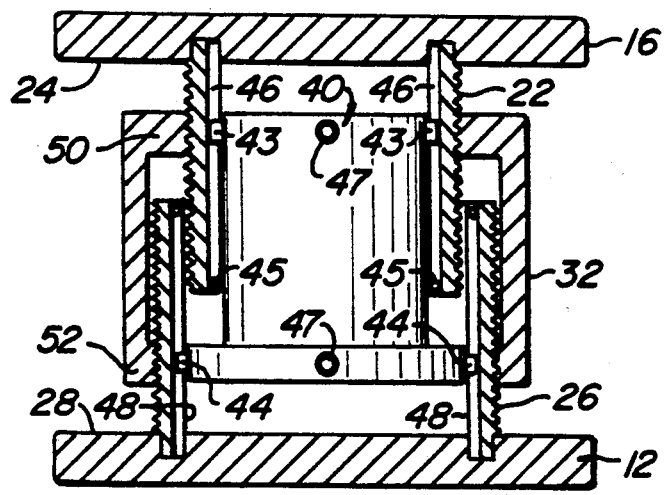
FIG. 3 is a sectional view of the adjustable height support column of FIG. 1, shown with its height partially collapsed.

An adjustable height support column 10 constructed in accordance with the principles of the present invention is illustrated in FIGS. 1-3. The support column 10 includes a first base plate 12 having a plurality of mounting holes 14 to permit attachment to a surface (not shown). The surface will usually be a horizontal surface with the support column 10 projecting upward, but there is no reason that the support surface cannot be inclined, inverted, or in motion.

The support column 10 further includes a second support plate 16 located at its upper end when the column is projecting upward from a horizontal surface. The support plate 16 includes a plurality of attachment holes 18 for securing devices or components thereto. Usually, the devices or components will be optical elements, such as mirrors, beam splitters, lenses, gratings, and the like, which will frequently be present in frames or holders to facilitate mechanical attachment to the support plate 16. With such optical elements, it is desirable to be able to raise and lower the support plate 16 relative to the base plate 12 in order to provide for proper vertical positioning. The present invention is particularly concerned with a vertically adjustable support linkage 20 which joins the base plate 12 to the support plate 16, as will now be described in detail.

The support linkage 20 comprises a first externally threaded shaft 22 secured to a lower surface 24 of the support plate 16, a second externally threaded shaft 26 secured to an upper surface 28 of the base plate 12, a bridging or linking mechanism 30 within the shafts 22 and 26 for slidably joining them together, and a coupling member 32 which threadably engages the exteriors of both of the shafts 22 and 26. The linking mechanism 30 permits the first threaded shaft 22 to axially translate relative to the second threaded shaft 26 so that they can be shifted between a fully extended position (as illustrated in FIG. 2) and a retracted position where the shaft 22 is fully received within a hollow interior 34 of shaft 26. The support column 10 is illustrated in a partially retracted configuration in FIG. 3 but can be even further retracted. Relative axial translation of the shafts 22 and 26 is effected by rotation of the coupling member 32 which causes the desired relative motion.

The nature of the linking mechanism 30 is not critical. It is only necessary that the mechanism 30 allow for the desired relative axial translation between the shafts 22 and 26 while preventing relative rotational movement. The mechanism 30 should further be located entirely within the hollow interiors of shafts 22 and 26, respectively, so that it does not interfere with the motion of the exterior coupling member 32.

As illustrated in the exemplary embodiment, the linking mechanism 30 comprises a cylinder 40 having a shank portion 41 and a flange portion 42. The shank portion 41 slides closely within hollow interior 35 of shaft 22 while the flange portion 42 slides clearly within hollow interior 34 of shaft 26. First sliding members 43 engage a pair of tracks or channels 46 formed on the interior surface of the first shaft 22. Similarly, second sliding members 44 engage tracks or channels 48 formed on the interior surface of the second shaft 26. In this way, the cylinder 40 permits the relative axial motion of the shafts 22 and 26 while maintaining the shafts (and consequently the plates 12 and 16) in a fixed rotational alignment.

It will be appreciated that a wide variety of other mechanisms can be used to link the first shaft 22 to the second shaft 26. For example, the brackets 40 could be replaced by a single plate of framework having two or more engagement members at each end which engage channels 46 and 48 in a manner similar to the individual cylinder 40. It is important only that the linking mechanism, as a whole, be axially slidable so that it can move axially with the shaft members as they are moved relative to each other. That is, the linking member cannot be fixed to either shaft member or it would inhibit the ability of the shafts to collapse from their fully extended configuration (as illustrated in FIG. 2) to a fully collapsed configuration (which is approached in FIG. 3).

In order to prevent the cylinder 40 from dropping out of either of the shafts 22 or 26, spring-loaded pins 45 are placed at the end of each channel 46 and 48. Additionally, spring-loaded plungers 47 may be placed on the cylinder 40 so that they contact the interior walls of both shafts 22 and 26 to lessen rattling and prevent the cylinder from abruptly dropping within the post 10.

The coupling member 32 is preferably in the form of a barrel having a first flange 50 at its upper end and a second flange 52 at its lower end. The flange 50 will have a threaded aperture which is received on the external threads of shaft 22, while the flange 52 will have a threaded aperture which is received on the external threads of shaft 26. The diameters of the two apertures will be selected to match those of the diameters of their respective shafts. The direction of threading on shafts as well as the flanges 50 and 52 will be selected so that rotation of the barrel 32 in a first direction causes the shafts to draw together while rotation in the opposite direction causes the shafts to move apart. Desirably, the barrel 32 will be ribbed on its exterior to facilitate manual turning by the user. In this way, when the support column 10 is mounted on a surface, the user will be able to adjust the height of the column using a single hand.

A mechanism for clamping the coupling member 32 to hold the vertical adjustment may also be provided. As illustrated, the mechanism may be a locking screw 60 (FIG. 1) which can be used to clamp an axial split 62 formed in the barrel of the coupling member 32.

Although the foregoing invention has been described in detail for purposes of clarity of understanding, it will be obvious that certain modifications may be practiced within the scope of the appended claims.

What is claimed is:

1. An adjustable height support column comprising:
   a first plate having a first threaded shaft projecting therefrom;
   a second plate having a second threaded shaft projecting therefrom, wherein one of the first and second shafts is telescopically received in the other;
   means within the first and second shafts for slidably and rotationally aligning said shafts; and
   a coupling member having a first threaded end which engages the first threaded shaft and a second threaded end which engages the second threaded shaft, whereby rotation of the coupling member causes axial motion without rotational motion between the first and second plates.

2. An adjustable height support column as in claim 1, wherein the first plate is a base plate having mounting holes for securing to a surface and the second plate is a support plate having mounting holes for securing an optical element.

3. An adjustable height support column as in claim 1, wherein the means for axially and rotationally aligning the shafts comprises a cylinder having ends which fit into an interior volume of each shaft and means on the cylinder ends for engaging tracking means on the shaft interiors.

4. An adjustable height support column as in claim 1, wherein the coupling member is a barrel having a flange defining the threads at each end.

5. An adjustable height support column as in claim 4, wherein the barrel has a first flange defining a threaded aperture having a diameter equal to the exterior diameter of the first threaded shaft and a second flange defining a threaded aperture having a diameter equal to the exterior diameter of the second threaded shaft.

6. An adjustable height support column as in claim 5, further comprising a locking screw disposed to clamp an axially split barrel.

7. An adjustable height support column as in claim 1, wherein the lengths of the first shaft, second shaft, aligning means, and coupling member are substantially equal.

8. An adjustable height support column comprising:
   a first plate having a first externally threaded cylindrical shaft projecting therefrom, said first shaft having a hollow interior with at least two axial tracks formed thereon;
   a second plate having a second externally threaded cylindrical shaft projecting therefrom, said second shaft having a hollow interior with at least two axial tracks formed thereto and aligned with the tracks on the first shaft to form aligned pairs, wherein the second shaft is sized to be axially received in the hollow interior of the first shaft;

a cylinder having fixed pins engaging each aligned pair of tracks to prevent relative rotation while permitting relative axial translation of the shafts; and a coupling member having a first threaded end which engages the first threaded shaft and a second threaded end which engages the second threaded shaft, whereby rotation of the coupling member causes axial motion without rotational motion between the first and second plates.

9. An adjustable height support column as in claim 8, wherein the first plate is a base plate having mounting holes for securing to a surface and the second plate is a support plate having mounting holes for securing an optical element.

10. An adjustable height support column as in claim 8, wherein the coupling member is a barrel having a flange defining the threads at each end.

11. An adjustable height support column as in claim 10, wherein the barrel has a first flange defining a threaded aperture having a diameter equal to the exterior diameter of the first threaded shaft and a second flange defining a threaded aperture having a diameter equal to the exterior diameter of the second threaded shaft.

12. An adjustable height support column as in claim 11, further comprising a locking screw disposed to clamp an axially split barrel.

13. An adjustable height support column as in claim 8, wherein the lengths of the first shaft, second shaft, aligning means, and coupling member are substantially equal.

* * * * *